United States Patent
Shin et al.

(10) Patent No.: US 8,749,592 B2
(45) Date of Patent: Jun. 10, 2014

(54) DISPLAY APPARATUS HAVING A MICRO-ELECTRO-MECHANICAL SYSTEM

(75) Inventors: Kyoung-Ju Shin, Hwaseong-si (KR); Chong-Chul Chai, Seoul (KR); Eun-Ju Kim, Yongin-si (KR)

(73) Assignee: Samsung Display Co., Ltd., Yongin (KR)

( * ) Notice: Subject to any disclaimer, the term of this patent is extended or adjusted under 35 U.S.C. 154(b) by 585 days.

(21) Appl. No.: 12/623,014

(22) Filed: Nov. 20, 2009

(65) Prior Publication Data

US 2010/0134390 A1  Jun. 3, 2010

(30) Foreign Application Priority Data

Dec. 3, 2008 (KR) .......................... 10-2008-0121885

(51) Int. Cl.
*G09G 5/10* (2006.01)
*G09G 3/36* (2006.01)

(52) U.S. Cl.
USPC ........................................... 345/690; 345/89

(58) Field of Classification Search
None
See application file for complete search history.

(56) References Cited

U.S. PATENT DOCUMENTS

2007/0205969 A1*  9/2007  Hagood et al. ................. 345/84

FOREIGN PATENT DOCUMENTS

| JP | 2000-028933 | 1/2000 |
|---|---|---|
| JP | 2002-229012 | 8/2002 |
| KR | 1020080037072 | 4/2008 |

* cited by examiner

*Primary Examiner* — Daniell L Negron
(74) *Attorney, Agent, or Firm* — H.C. Park & Associates, PLC (57) ABSTRACT

The present invention relates to a display apparatus with pixels, wherein each pixel includes a switching device, a micro-electro-mechanical system (MEMS), and a gray scale control device. The switching device can be connected to a gate line and a data line to output a corresponding data signal in response to a gate signal. The MEMS may be connected to an output electrode of the switching device to transmit or block light in response to the corresponding data signal. The gray scale control device may be coupled to the output electrode of the switching device to control a time interval during which the corresponding data signal is applied to the MEMS. Accordingly, each pixel may display a desired gray scale.

8 Claims, 12 Drawing Sheets

DISPLAY APPARATUS HAVING A MICRO-ELECTRO-MECHANICAL SYSTEM

CROSS REFERENCE TO RELATED APPLICATION

This application claims priority from and the benefit of Korean Patent Application No. 10-2008-0121885, filed on Dec. 3, 2008, which is hereby incorporated by reference for all purposes as if fully set forth herein

BACKGROUND OF THE INVENTION

1. Field of the Invention

Embodiments of the present invention relate to a display apparatus. In particular, embodiments of the present invention relate to a display apparatus having a micro-electro-mechanical system (MEMS).

2. Discussion of the Background

A display apparatus can be used to display images and can include a display substrate in which pixels are arranged. The display apparatus can be utilized in various electronic appliances such as a television set, a monitor, a mobile phone, and a notebook computer. The display apparatus can also display images corresponding to data processed in mobile information processors used in the electronic appliances.

In order to improve mobility of mobile information processors, recently various studies have been performed. For example, one of the recent studies has shown that a MEMS can be realized by integrating mechanical parts (e.g., sensor, actuator) on a substrate. The MEMS can be used to improve certain functions of the mobile information processors, thereby improving the mobility of the mobile information processors. In addition, since the MEMS can be manufactured using conventional semiconductor and LCD manufacturing technology, the MEMS can be utilized in various electronic appliances and devices.

SUMMARY OF THE INVENTION

Exemplary embodiments of the present invention provide a display apparatus including a micro-electro-mechanical system capable of displaying gray scales.

Additional features of the exemplary embodiments will be set forth in the description which follows, and in part will be apparent from the description, or may be learned by practice of the invention.

An exemplary embodiment of the present invention discloses a display apparatus comprising a plurality of gate lines sequentially receiving a gate signal, a plurality of data lines receiving a plurality of data signals, respectively, and a plurality of pixels arranged in a plurality of pixel areas, respectively. The plurality of pixels is defined by the plurality of gate lines and the plurality of data lines. The plurality of data lines is arranged approximately perpendicular to the plurality of gate lines. Each pixel of the plurality of pixels comprises a switching device, a micro-electro-mechanical system, and a control device. The switching device is coupled to a corresponding gate line of the plurality of gate lines and to a corresponding data line of the plurality of data lines. The switching device is configured to output a corresponding data signal in response to the gate signal. The micro-electro-mechanical system is coupled to an output electrode of the switching device to control output of a light signal in response to the corresponding data signal. The control device is coupled to the output electrode to control a time interval during which the corresponding data signal is applied to the micro-electro-mechanical system.

An exemplary embodiment of the present invention discloses a display apparatus comprising a plurality of gate lines sequentially receiving a gate signal and a plurality of data lines receiving a plurality of data signals, respectively. The plurality of data lines is arranged approximately perpendicular to the plurality of gate lines. A plurality of pixels is arranged in a plurality of pixel areas, respectively. The plurality of pixel areas is defined by the plurality of gate lines and the plurality of data lines. A gate driver is coupled to a first end of each of the plurality of gate lines to sequentially apply the gate signal to the plurality of gate lines. A data driver is coupled to a first end of each of the plurality of data lines to apply the data signals to the plurality of data lines. Each pixel of the plurality of pixels comprises a switching device, a micro-electro-mechanical system, and a control device. The switching device is coupled to a corresponding gate line of the plurality of gate lines and to a corresponding data line of the plurality of data lines. The switching device is configured to output a corresponding data signal in response to the gate signal. The micro-electro-mechanical system is coupled to an output electrode of the switching device to control output of a light signal in response to the corresponding data signal. The control device is coupled to the output electrode to control a time interval during which the corresponding data signal is applied to the micro-electro-mechanical system.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on", "connected to" or "coupled to" another element or layer, the element or layer can be directly on, connected or coupled to the other element or layer and/or intervening elements or layers may be present. In contrast, when an element is referred to as being "directly on," "directly connected to" or "directly coupled to" another element or layer, there may be no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" can include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Figure 1:
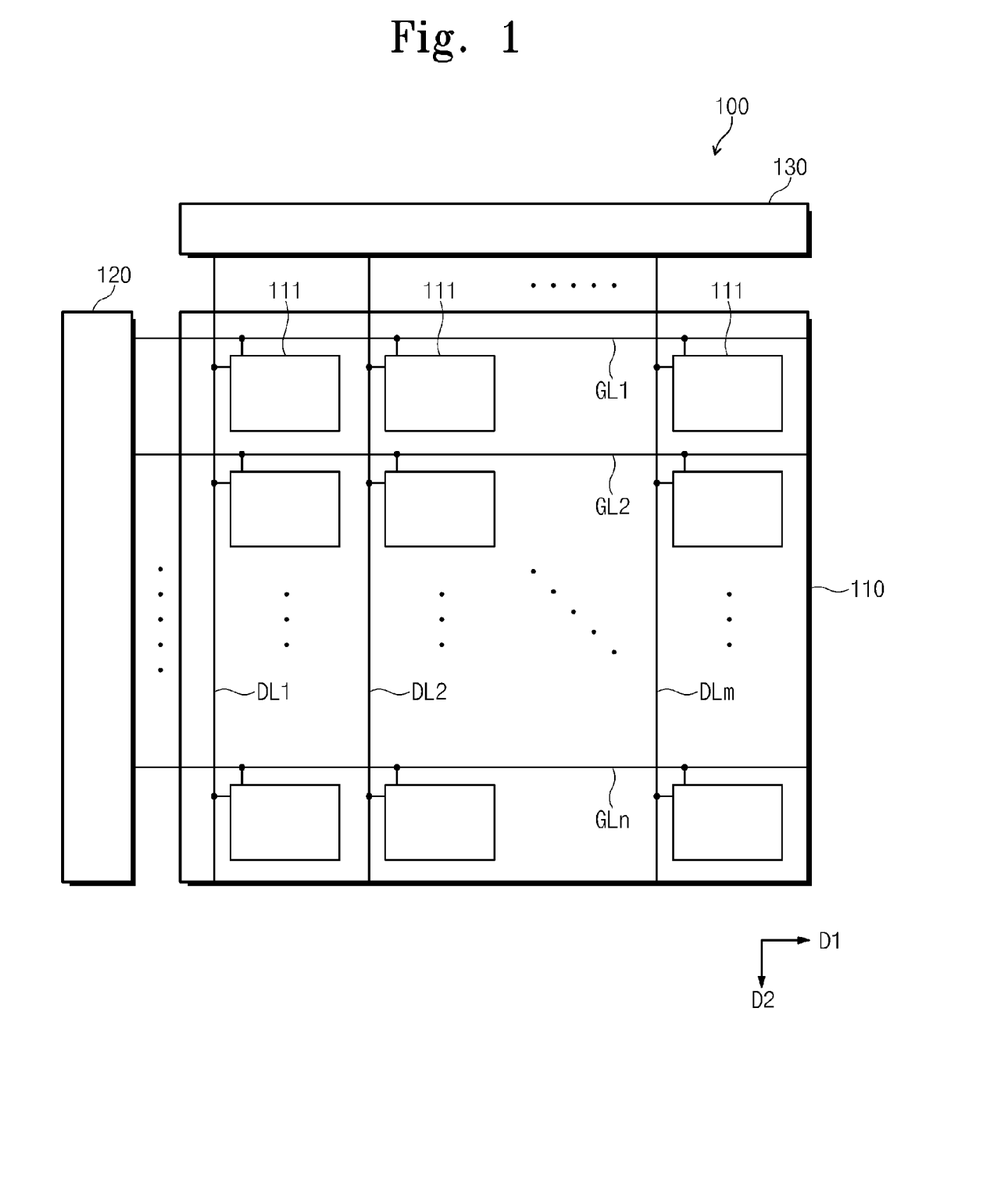
FIG. 1 is a block diagram of a display apparatus according to an exemplary embodiment of the present invention.

FIG. 1 illustrates a block diagram of a display apparatus according to an exemplary embodiment of the present invention.

Referring to FIG. 1, a display apparatus 100 can include a substrate 110, a plurality of gate lines GL1~GLn, a plurality of data lines DL1~DLm, and a plurality of pixels 111.

The substrate 110 may be a transparent substrate such as, a transparent insulating material. The gate lines GL1~GLn, data lines DL1~DLm, and the pixels 111 may be arranged on the substrate 110. The gate lines GL1~GLn can extend in a first direction D1 and can be positioned in a second direction D2 substantially perpendicular to the first direction D1. The data lines DL1~DLm extend in the second direction D2 and are positioned in the first direction D1. In general, the gate lines GL1~GLn and the data lines DL1~DLm can be extended and positioned in any suitable orientation and direction. Any suitable material may be used to form the transparent substrate.

The display apparatus 100 can also include a gate driver 120 and a data driver 130. One end of each gate line GL1~GLn may be coupled to the gate driver 120. One end of each data line DL1~DLm may be coupled to the data driver 130. The gate driver 120 may output a gate signal to the gate lines GL1~GLn and the data driver 130 may output data signals to the data lines DL1~DLm. The gate signals can be supplied to the gate lines GL1~GLn sequentially or in any suitable manner. When the gate signal is applied to a corresponding gate line of the gate lines GL1~GLn, the pixels connected to the corresponding gate line to which the gate signal is applied can receive the data signals through data lines DL1~DLm.

Pixel areas are defined in the substrate 110 by the gate lines GL1~GLn and the data lines DL1~DLm, and the pixels 111 can be arranged in the pixel areas, respectively.

Hereinafter, each pixel will be described in detail with reference to FIGS. 2 to 10 and FIGS. 12 to 15.

Figure 2:
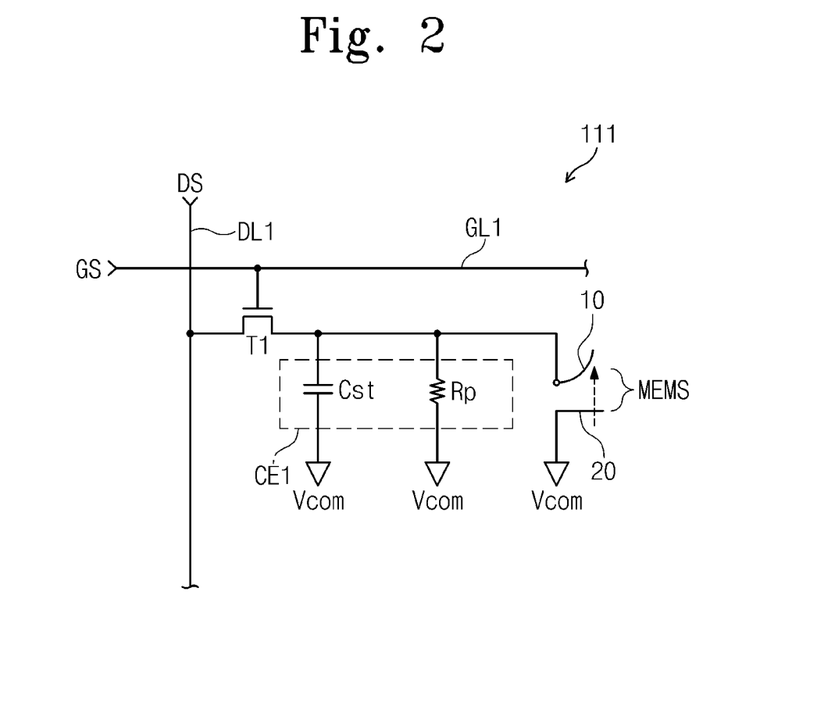
FIG. 2 is a circuit diagram of a pixel according to an exemplary embodiment of the present invention.

FIG. 2 shows a circuit diagram of a pixel according to an exemplary embodiment of the present invention.

Referring to FIG. 2, each of the pixels 111 may include a first transistor T1, a first gray scale control device CE1, and a MEMS.

The first transistor T1 may include a gate electrode connected to a corresponding gate line (hereinafter, referred to as a first gate line GL1), a source electrode connected to a corresponding data line (hereinafter, referred to as a first data line DL1), and a drain electrode connected to the MEMS. The MEMS may include a first electrode 10 connected to the drain electrode of the first transistor T1 and a second electrode 20 receiving a common voltage, Vcom. In general, the gate, source, drain, first and second electrodes may be made of any suitable conducting material.

When a gate signal GS is applied to the first gate line GL1, the first transistor T1 may be switched on in response to the gate signal GS, and a data signal DS applied to the first data line DL1 can be output from the drain electrode of the first transistor T1.

In the present exemplary embodiments, the first gray scale control device CE1 may include a storage capacitor Cst and a resistor Rp. The storage capacitor Cst may include a first electrode connected to the drain electrode of the first transistor T1 and a second electrode connected to a common voltage terminal to which common voltage Vcom is applied. Although not shown in FIG. 2, a dielectric substance can be placed between the first and second electrodes of the storage capacitor Cst. The resistor Rp may be connected between the drain electrode of the first transistor T1 and the common voltage terminal. In general, the resistor Rp and storage capacitor Cst can be coupled to one another, rearranged, or configured in various suitable manner.

When the data signal is output from the drain electrode of the first transistor T1, a charge may be stored in the storage capacitor Cst thus providing a voltage across the storage capacitor Cst. The voltage across the storage capacitor Cst may be proportional to the voltage provided by the data signal. When the first transistor T1 is switched off by stopping application of the gate signal, the charge stored in the storage capacitor Cst gradually discharges through resistor Rp leading to a decrease in voltage (hereinafter, referred to as a gray scale voltage) across the storage capacitor Cst.

If the gray scale voltage is larger than the threshold voltage of the MEMS, the MEMS may operate in a turn-on state. If the gray scale voltage is below the threshold voltage or the gray scale voltage drops below the threshold voltage, the MEMS may operate in a turn-off state. In general, a MEMS device can be considered to operate in a turn-on state when the MEMS device provides a high (e.g., 100%) transmittance. A MEMS device can be considered to operate in a turn-off state when the MEMS device provides a low (e.g., 0%) transmittance. In some cases, a time interval required to completely discharge the gray scale voltage can be determined by a voltage level of the data signal.

Figure 3:
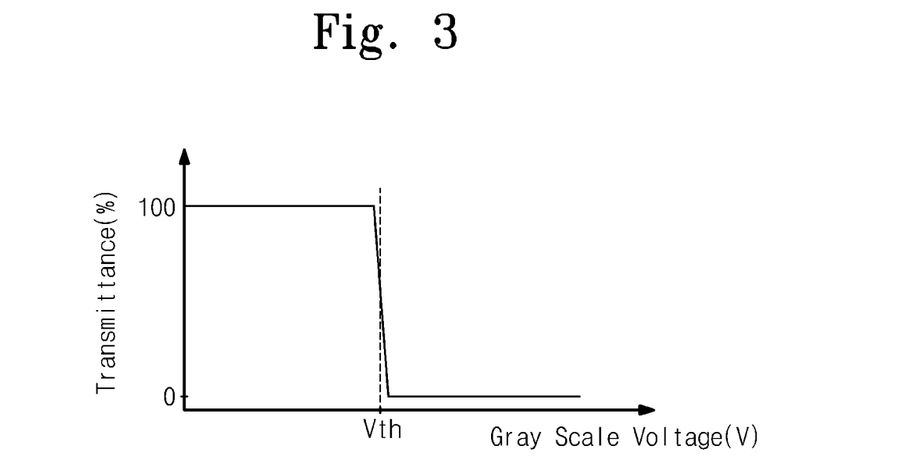
FIG. 3 is a graph showing transmittance with respect to a gray scale voltage according to an exemplary embodiment of the present invention.
Figure 4:
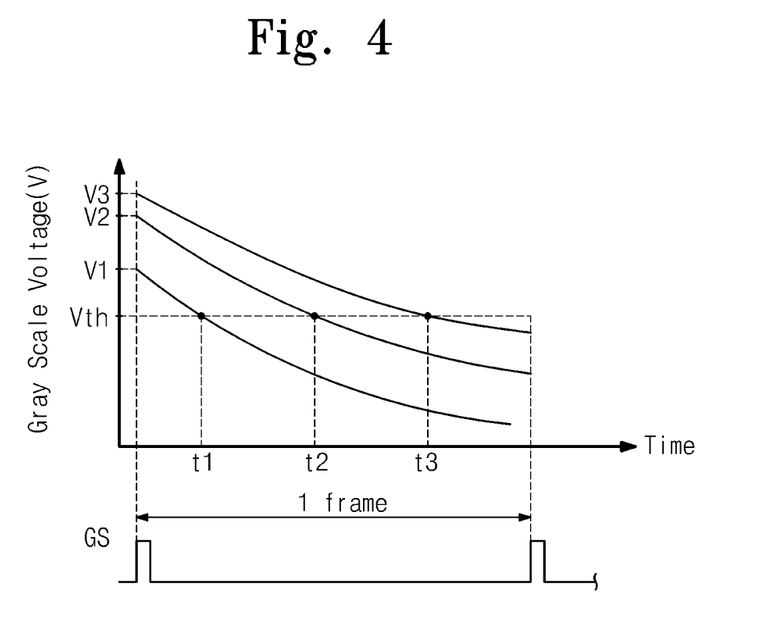
FIG. 4 is a graph showing variation of gray scale voltage with respect to time interval according to an exemplary embodiment of the present invention.

FIG. 3 is a graph showing transmittance with respect to a gray scale voltage. FIG. 4 is a graph showing variation of gray scale voltage with respect to time, and FIGS. 5A to 5C are graphs showing the transmittance-time interval correlation according to gray scale voltage.

Referring to FIG. 3, when a gray scale voltage higher than the threshold voltage is applied to the first electrode 10, transmittance of the MEMS may be lowered to zero percent. FIG. 3 demonstrates an example in which the MEMS is assumed to have a significantly high transmittance (e.g., 100%) before the gray scale voltage is applied to the first electrode 10 of the MEMS. FIG. 3 shows that the transmittance can vary drastically relative to the threshold voltage Vth and that the transmittance does not gradually (i.e., decline slowly) change in response to variations in the gray scale voltage. Accordingly, controlling transmittance by adjusting a voltage level of the gray scale voltage can be difficult and problematic.

In the present exemplary embodiments, a gray scale voltage can be applied during a controlled time interval to control the transmittance instead of adjusting the voltage level of the gray scale voltage.

Figure 5A:
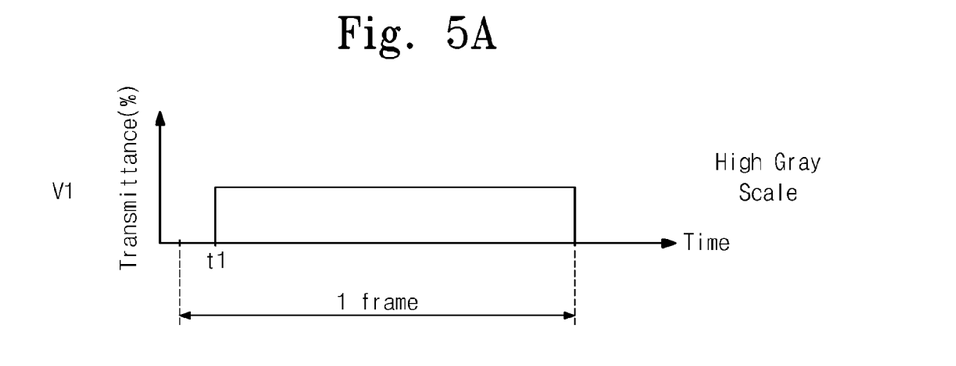
FIG. 5A, FIG. 5B, and FIG. 5C are graphs showing the correlation of transmittance and time interval with respect to gray scale voltage according to an exemplary embodiment of the present invention.
Figure 5B:
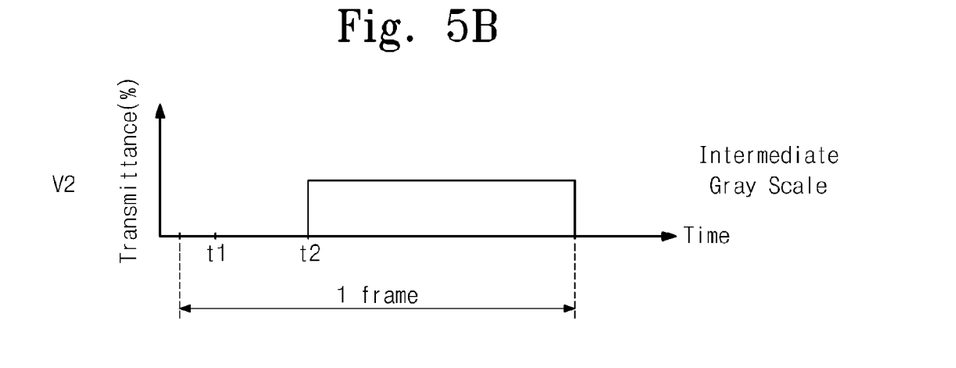
Figure 5C:
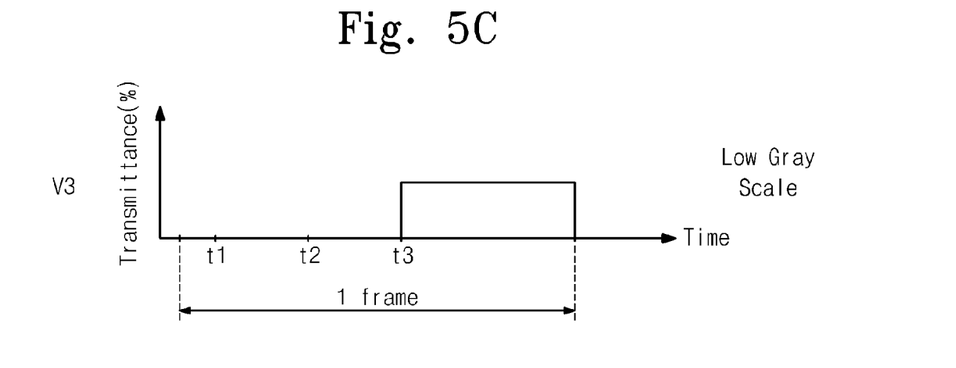

FIGS. 2, 4, and 5A-5C illustrate examples of controlling the transmittance at different time intervals. For example, as shown in FIGS. 4 and 5A, the gray scale voltage can be set to a first voltage level V1 within a high period of a gate signal in one frame period. The gray scale voltage can then be lowered below the threshold voltage Vth after lapse of a first time interval t1. Consequently, the MEMS has a transmittance of 0% before lapse of the first time interval t1 and a transmittance of 100% after the lapse of the first time interval t1. In this case, the pixels may display a high gray scale since the time interval during which the MEMS transmits light therethrough is longer than the first time interval t1, as shown in FIG. 5A.

According to some exemplary embodiments illustrated by FIGS. 4 and 5B, the gray scale voltage can initially be set to a second voltage level V2 higher than the first voltage level V1 within the high period of the gate signal in the one frame period. Subsequently, the gray scale voltage can be lowered below the threshold voltage Vth after lapse of a second time interval t2 longer than the first time interval t1. In such cases, the MEMS has a transmittance of 0% before the lapse of the second time interval t2 and a transmittance of 100% after the lapse of the second time interval t2. In other words, when the gray scale voltage has the second voltage level V2 higher than the first voltage level V1, the pixels may display the intermediate gray scale lower than the high gray scale since the time interval during which the MEMS transmits the light therethrough is shortened compared with the time interval when the gray scale voltage has the first voltage level V1.

According to some exemplary embodiments illustrated by FIGS. 4 and 5C, the gray scale voltage can initially be set to a third voltage level V3 higher than the second voltage level V2 within the high period of the gate signal in the one frame period. Subsequently, the gray scale voltage can be lowered below the threshold voltage Vth after the lapse of a third time interval t3 longer than the second time interval t2. In such cases, the MEMS has a transmittance of 0% before the lapse of the third time interval t3 and a transmittance of 100% after the lapse of the third time interval t3. When the gray scale voltage has the third voltage level V3 higher than the second voltage level V2, the pixels may display the low gray scale (i.e., lower than the intermediate gray scale) since the time interval during which the MEMS transmits the light therethrough is shortened compared with the time interval when the gray scale voltage has the second voltage level V2.

According to exemplary embodiments, the voltage level of the gray scale voltage may be determined by the voltage level of the data signal. As described above, when the first gray scale control device CE1 is arranged in each pixel 111, the time interval during which the MEMS transmits light therethrough may be controlled by the voltage level of the data signal, so that pixel 111 may display a desired gray scale.

Figure 6:
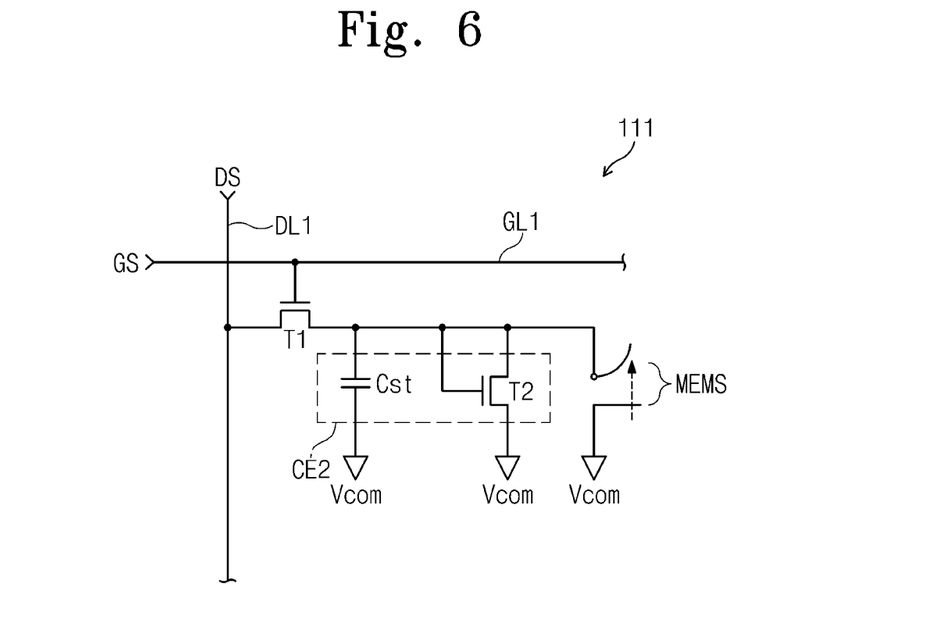
FIG. 6 is a circuit diagram of a pixel before a voltage is applied according to an exemplary embodiment of the present invention.
Figure 7:
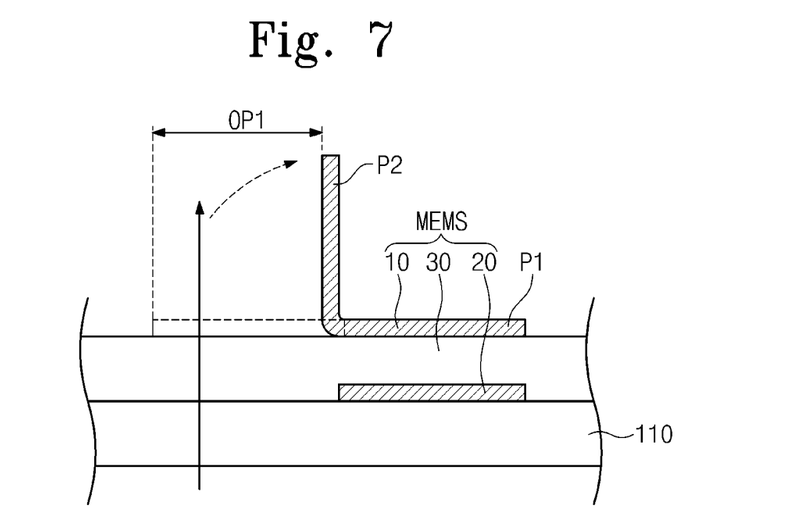
FIG. 7 is a sectional view showing the MEMS of FIG. 6.

FIG. 6 illustrates a circuit diagram of a pixel before applying a voltage according to some exemplary embodiments, and FIG. 7 shows sectional view of the MEMS illustrated in FIG. 6. In FIG. 6, the same reference numerals denote the same elements in FIG. 2, and thus detailed descriptions of the same elements will be omitted.

Referring to FIG. 6, each pixel 111 may include a first transistor T1, a second gray scale control device CE2, and MEMS.

The second gray scale control device CE2 may include a storage capacitor Cst and a second transistor T2. The second transistor T2 may have a source electrode receiving the common voltage Vcom, and gate and drain electrodes, which are commonly connected to a drain electrode of the first transistor T1.

When the data signal is output through the drain electrode of the first transistor T1, a charge may be stored in the storage capacitor Cst thus providing a voltage across the storage capacitor Cst. The voltage across the storage capacitor Cst may be proportional to the voltage provided by the data signal. When the first transistor T1 is switched off by stopping application of the gate signal, the charge stored in the storage capacitor Cst gradually discharges by a current of the second transistor T2. This leads to a decrease in voltage across the storage capacitor Cst.

As shown in FIG. 7, the second electrode 20 of the MEMS may be formed on an upper surface of substrate 110 and covered by an insulating layer 30. Any suitable insulating material may be used for the insulating layer. The first electrode 10 may be formed on the insulating layer 30 and situated above the second electrode 20. In general, the first and second electrodes 10 and 20 may be made of any suitable conducting material. The first electrode 10 may include a fixing portion P1 facing the second electrode 20 and a shutter portion P2 that may be coupled to the fixing portion P1. The first and second electrodes 10 and 20 may include a metal material having light blocking properties.

The position of the shutter portion P2 of the first electrode 10 may vary depending on the type of force(s) applied to the first electrode 10. For example, the position of the shutter portion P2 may change if a repulsive force or an attractive force is applied. In some cases, when both the first and second electrodes 10 and 20 are electrified with a negative (−) polarity, that is, the gray scale voltage is not applied to the first electrode 10, the resulting force may cause the shutter portion P2 to move upwardly as indicated in FIG. 7 and cause the shutter portion P2 to be separated from the upper surface of the insulating layer 30. As a result, the first electrode 10 can be bent, at least partially, so that a first opening OP1 is defined on substrate 10.

Although not shown in FIGS. 6 and 7, a backlight unit can be placed at a rear of the substrate 110 to output light. In such a case, the backlight unit can output a light signal that exits via the first opening OP1. Thus, since the light passes through the first opening OP1 while the gray scale voltage is not applied to the first electrode 10 of the MEMS, the display apparatus 100 (see FIG. 1) is operated in a normally white mode.

However, according to other exemplary embodiments, the MEMS may be configured to have circuit configurations to block the light signal while the gray scale voltage is not applied to the first electrode 10 thereof. In such cases, the display apparatus 100 may be operated in a normally black mode.

Figure 8:
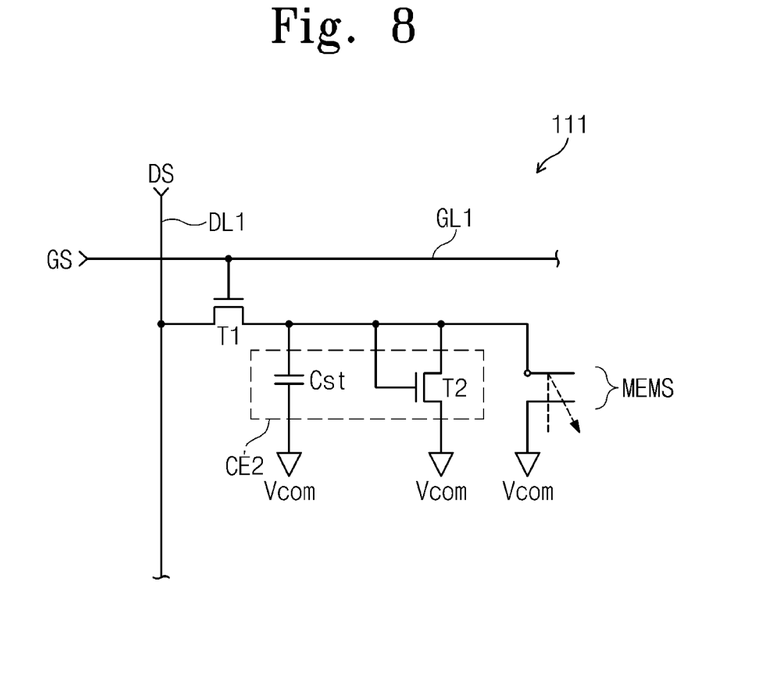
FIG. 8 is a circuit diagram showing a pixel after a voltage is applied according to an exemplary embodiment of the present invention.
Figure 9:
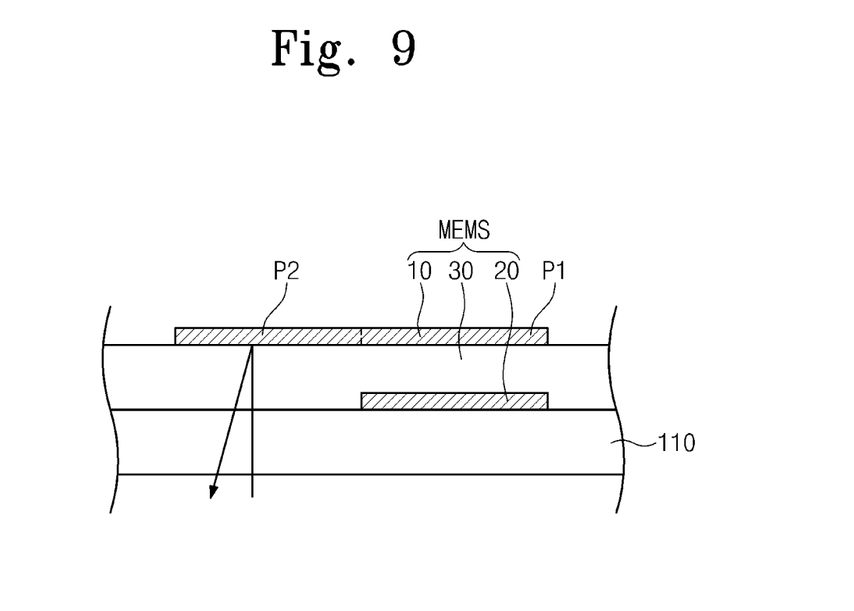
FIG. 9 is a sectional view showing the MEMS of FIG. 8.

FIG. 8 illustrates a circuit diagram of a pixel after a voltage is applied, according to an exemplary embodiment. FIG. 9 is a sectional view showing the MEMS of FIG. 8.

Referring to FIGS. 8 and 9, when the gray scale voltage is applied to the first electrode 10 of the MEMS, the shutter portion P2 may be attached to the upper surface of the insulating layer 30 by the attractive force between the first and second electrodes 10 and 20 since the first electrode 10 is electrified with a positive (+) polarity. As a result, the first opening OP1 shown in FIG. 7 is closed by the shutter portion P2, so that the light generated by the backlight unit is blocked by the shutter portion P2.

The second gray scale control device CE2 of each pixel 111 controls the time interval during which the gray scale voltage is applied to the first electrode 10. As described above, the second gray scale control device CE2 can include a storage capacitor Cst and a second transistor T2. The gray scale voltage charged in the storage capacitor Cst can be gradually discharged by the on-current of the second transistor T2. Thus, the time interval during which the gray scale voltage is applied to the first electrode 10 may be controlled.

In one frame period, when the time interval (i.e., the time interval of applying the gray scale voltage) during which the shutter portion P2 is closed is relatively long, each pixel 111 may display the low gray scale. When the time interval during which the shutter portion P2 is closed is relatively short, each pixel 111 may display the high gray scale. If the shutter portion P2 is closed throughout the one frame period, each pixel 111 displays a black gray scale.

Structures of the MEMS are not limited to those shown in FIGS. 7 and 9 and may be embodied in various structures.

Figure 10:
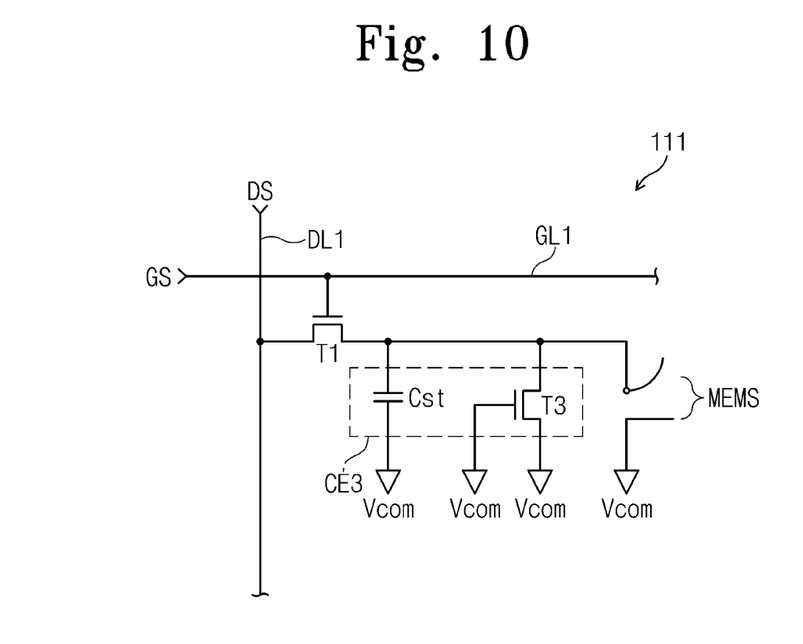
FIG. 10 is a circuit diagram of a pixel according to an exemplary embodiment of the present invention.

FIG. 10 is a circuit diagram of a pixel according to an exemplary embodiment of the invention. In FIG. 10, the reference numerals denote the same elements in FIG. 2, and detailed descriptions of the same elements will be omitted.

Referring to FIG. 10, a pixel 111 may include a first transistor T1, a third gray scale control device CE3, and a MEMS. The third gray scale control device CE3 may include a storage capacitor Cst and a third transistor T3.

The third transistor T3 may include a drain electrode connected to the drain electrode of the first transistor T1, and source and gate electrodes receiving the common voltage Vcom. Since the third transistor T3 is in a turn-off state, the charge stored in the storage capacitor Cst due to the gray scale voltage may gradually discharge through a current of the third transistor T3.

As described above, when the stored charge is discharged through the third gray scale control device CE3, the pixel 111 may display the gray scale by using a time interval during which the initial voltage level of the gray scale voltage reaches the threshold voltage Vth.

Figure 11:
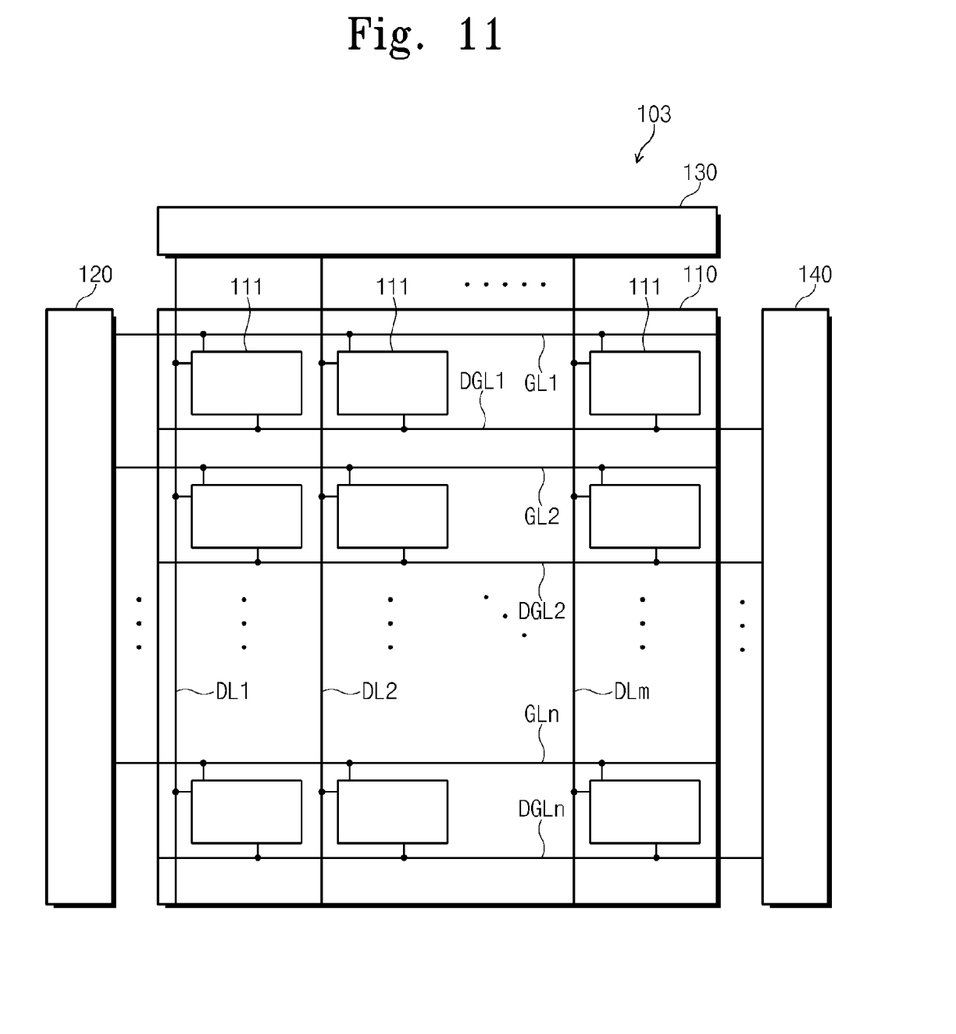
FIG. 11 is a block diagram of a display apparatus according to an exemplary embodiment of the present invention.
Figure 12:
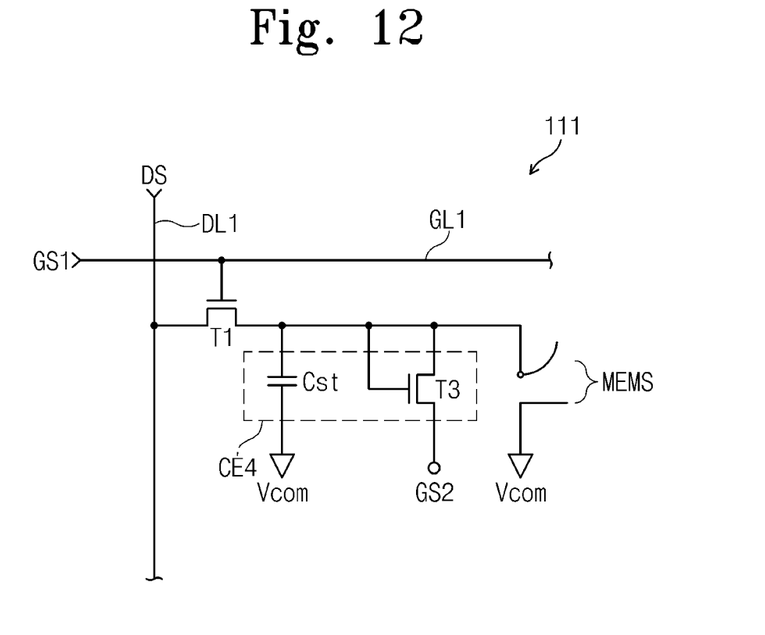
FIG. 12 is a circuit diagram showing the pixel of FIG. 11.
Figure 13:
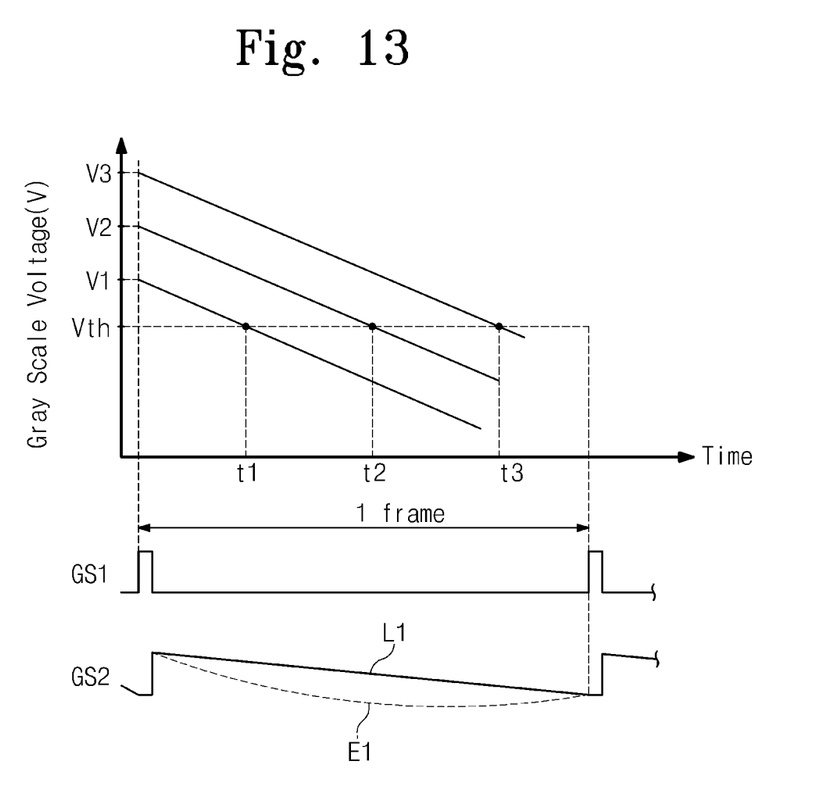
FIG. 13 is a graph showing variation of gray scale voltage with respect to time interval according to an exemplary embodiment of the present invention.

FIG. 11 is a block diagram of a display apparatus according to an exemplary embodiment of the invention. FIG. 12 is a circuit diagram of a pixel shown in FIG. 11. FIG. 13 is a graph showing variation of gray scale voltage according to various time intervals. In FIG. 11, the same reference numerals denote the same elements in FIG. 1, and detailed descriptions of the same elements will be omitted.

Referring to FIG. 11, a display apparatus 103 may include a substrate 110, a plurality of gate lines GL1~GLn, a plurality of data lines DL1~DLm, a plurality of pixels 111, and a plurality of dummy gate lines DGL1~DGLn.

The dummy gate lines DLG1~DGLn may extend in a direction substantially parallel to the gate lines GL1~GLn and may be positioned in a direction in which the gate lines GL1~GLn are positioned. In general, the gate lines GL1~GLn and the dummy gate lines DLG1~DGLn can be extended and positioned in any suitable orientation and direction. The display apparatus 103 may further include a dummy gate driver 140 connected to one end of each of the dummy gate lines DGL1~DGLn.

The dummy gate driver 140 can output a dummy gate signal to the dummy gate lines DGL1~DGLn, which is synchronized with the gate signal output from the gate driver 120. The dummy gate signal may be driven sequentially or in any suitable manner. According to some exemplary embodiments, the dummy gate signal may have a frequency equal to that of the gate signal and in other exemplary embodiments, the dummy gate signal may have a frequency different to that of the gate signal. A voltage level of the dummy gate signal is gradually reduced during the low period of the gate signal.

In some cases, the dummy gate driver 140 can be situated adjacent to a side of the substrate that is opposite to a side at which the gate driver 120 is situated. In other cases, the dummy gate driver 140 may be situated adjacent to the side at which the gate driver 120 is situated. In general, the dummy gate driver 140 may be situated in any suitable location.

Referring to FIGS. 12 and 13, each pixel 111 may include a first transistor T1, a fourth gray scale control device CE4, and a MEMS.

The fourth gray scale control device CE4 may include a storage capacitor Cst and a third transistor T3. The storage capacitor Cst may include a first electrode connected to a drain electrode of the first transistor T1 and a second electrode receiving a common voltage Vcom. The third transistor T3 may include gate and drain electrodes commonly connected to the drain electrode of the first transistor T1 and a source electrode to which the dummy gate signal GS2 can be applied.

When gate signal GS1 is applied to the first gate line GL1, the first transistor T1 is switched on, and data signal DS applied to the first data line DL1 can be output from the drain electrode of the first transistor T1.

When data signal DS is output from the drain electrode of the first transistor T1, a voltage may charge the storage capacitor Cst. Then, when gate signal GS1 is no longer applied, transistor T1 is switched off and the charge stored in storage capacitor Cst may be discharged by a current of the third transistor T3.

In some cases, the dummy gate signal GS2 may gradually reduce in synchronization with the gate signal GS1. As shown in FIG. 13, the voltage level of the dummy gate signal GS2 may decrease linearly (L1) during the low period of the gate signal GS1, which extends from a falling edge of a present frame period of the gate signal GS1 to a rising edge of a next frame period of the gate signal GS1. In some cases, the dummy gate signal GS2 may decrease exponentially (E1).

When the voltage level of the dummy gate signal GS2 is gradually reduced as the gray scale voltage is discharged, the voltage difference between the gray scales can become uniform over the entire gray scale region. As shown in FIGS. 5A-5C, a time interval having a low gray scale is shorter than a time interval having a high gray scale. However, as illustrated in FIG. 13, the period (i.e., the time interval from the time point t2 to the time point t3) in which the low gray scale is displayed is identical with the period (i.e., the time interval from the time point t1 to the time point t2) in which the high gray scale is displayed. Thus, the voltage difference between the gray scales may become uniform over the entire grays scale region by applying the dummy gate signal GS2 to the third transistor T3.

In FIG. 13, the dummy gate signal GS2 is reduced during the low period which extends from the falling edge of the present period of the gate signal GS1 to the rising edge of the next frame period of the gate signal GS1. However, the dummy gate signal GS2 may also be reduced during a period extending from the rising edge of the present frame period of the gate signal GS1 to the rising edge of the next frame period of the gate signal GS1.

Figure 14:
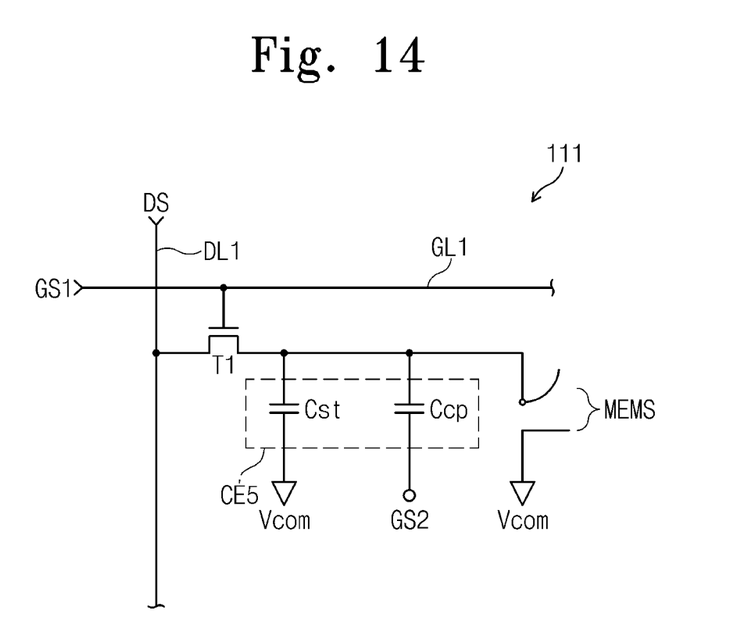
FIG. 14 is a circuit diagram of a pixel according to an exemplary embodiment of the present invention.
Figure 15:
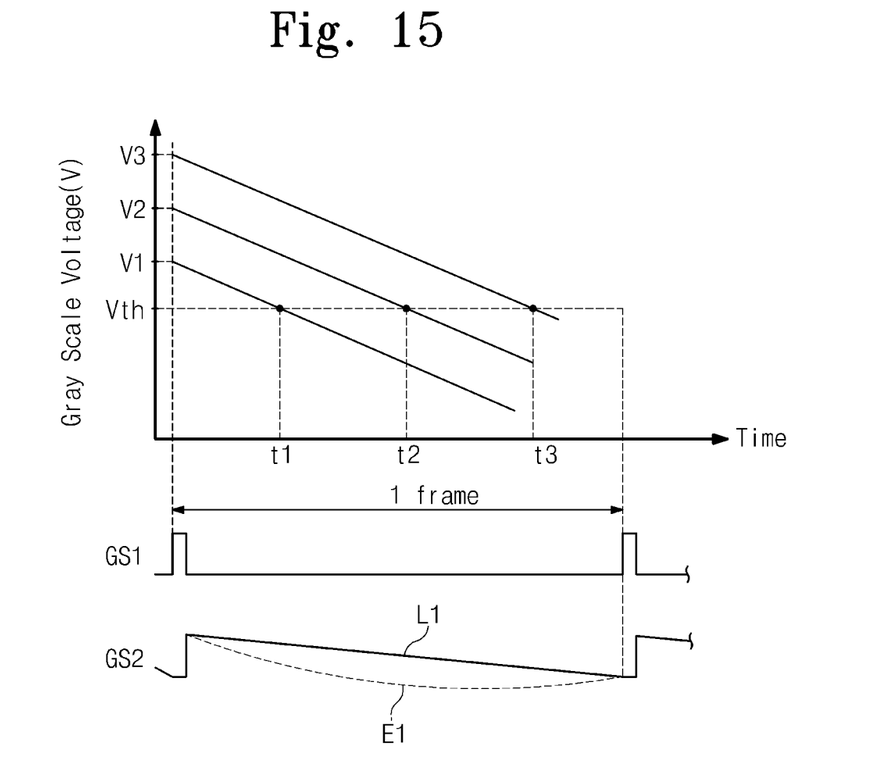
FIG. 15 is a graph showing variation of gray scale voltage with respect to time interval according to an exemplary embodiment of the present invention.

FIG. 14 is a circuit diagram of a pixel according to an exemplary embodiment of the present invention. FIG. 15 is a graph showing variation of gray scale voltage with respect to time interval.

Referring to FIG. 14, each pixel 111 may include a first transistor T1, a fifth gray scale control device CE5, and a MEMS.

The fifth gray scale control device CE5 may include a storage capacitor Cst and a coupling capacitor Ccp. The storage capacitor Cst may include a first electrode connected to a drain electrode of the first transistor T1 and a second electrode to which the common voltage Vcom is applied. The coupling capacitor Ccp may include a first electrode connected to the drain electrode of the first transistor T1 and a second electrode receiving the dummy gate signal GS2.

When the gate signal GS1 is applied to the first gate line GL1, the first transistor T1 is switched on and data signal DS applied to the first data line DL1 may be output from the drain electrode of the first transistor T1.

When the data signal DS is output from the drain electrode of the first transistor T1, charge may be stored in the storage capacitor Cst. Then, when the first transistor T1 is switched off by stopping application of the gate signal GS1, the voltage level of dummy gate signal GS2 may be reduced.

Accordingly, the gray scale voltage applied to the first electrode of the coupling capacitor Ccp may gradually reduce in synchronization with the dummy gate signal GS2 applied to the second electrode of the coupling capacitor Ccp. Thus, the gray scale voltage may decrease linearly or exponentially, so that the voltage difference between the gray scales may be uniform over the entire gray scale region.

Accordingly, in a display apparatus employing a MEMS device, each pixel can include a gray scale control device to control a time interval during which a gray scale voltage can be applied to the MEMS, thereby displaying the desired gray scale.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A display apparatus, comprising:
a plurality of gate lines to receive a gate signal;
a plurality of data lines to receive a plurality of data signals, respectively; and
a plurality of pixels,
wherein each pixel of the plurality of pixels comprises:
a switching device coupled to a corresponding gate line of the plurality of gate lines and to a corresponding data line of the plurality of data lines, the switching device configured to output a corresponding data signal in response to the gate signal;
a micro-electro-mechanical system coupled to an output electrode of the switching device to control output of a light signal in response to the corresponding data signal; and
a control device coupled to the output electrode to control a time period for which the micro-electro-mechanical system transmits the light signal such that the micro-electro-mechanical system transmits the light signal for a first time period in response to a first data signal, and transmits the light signal for a second time period different from the first time period in response to a second data signal different from the first data signal,
wherein the control device comprises a storage capacitor coupled to the output electrode and a resistance component coupled to the output electrode, the storage capacitor connected in parallel with the resistance component, and
wherein the output electrode, the storage capacitor, the resistance component, and a first electrode of the micro-electro-mechanical system are all directly connected to each other.

2. The display apparatus of claim 1, wherein the resistance component comprises a transistor.

3. The display apparatus of claim 2, wherein the transistor comprises:
a drain electrode coupled to the output electrode;
a gate electrode to receive a common voltage; and
a source electrode to receive the common voltage.

4. The display apparatus of claim 3, wherein the storage capacitor comprises:
a first electrode coupled to the output electrode; and a second electrode facing the first electrode and receiving a common voltage.

5. The display apparatus of claim 1, wherein the micro-electro-mechanical system further comprises:
a second electrode facing the first electrode; and
an insulating layer disposed between the first electrode and the second electrode,
wherein the first electrode comprises a fixing portion and a shutter portion coupled to the fixing portion, the shutter portion configured to control output of the light signal.

6. The display apparatus of claim 5, wherein the first electrode comprises an electrode material having a light blocking property.

7. A display apparatus, comprising:
a plurality of gate lines to receive a gate signal;
a plurality of data lines to receive a plurality of data signals, respectively;
a gate driver coupled to a first end of each of the plurality of gate lines to apply the gate signal to the plurality of gate lines;
a data driver coupled to a first end of each of the plurality of data lines to apply the data signals to the plurality of data lines; and
a plurality of pixels,
wherein each pixel of the plurality of pixels comprises:
a switching device coupled to a corresponding gate line of the plurality of gate lines and to a corresponding data line of the plurality of data lines, the switching device configured to output a corresponding data signal in response to the gate signal;
a micro-electro-mechanical system coupled to an output electrode of the switching device to control output of a light signal in response to the corresponding data signal; and
a control device coupled to the output electrode to control a time period for which the micro-electro-mechanical system transmits the light signal such that the micro-electro-mechanical system transmits the light signal for a first time period in response to a first data signal, and transmits the light signal for a second time period different from the first time period in response to a second data signal different from the first data signal,
wherein the control device comprises a storage capacitor coupled to the output electrode and a resistance component coupled to the output electrode, the storage capacitor connected in parallel with the resistance component, and
wherein the output electrode, the storage capacitor, the resistance component, and an electrode of the micro-electro-mechanical system are all directly connected to each other.

8. A display apparatus, comprising:
a plurality of gate lines to receive a gate signal;
a plurality of data lines to receive a plurality of data signals, respectively; and
a plurality of pixels,
wherein each pixel of the plurality of pixels comprises:
a switching device coupled to a corresponding gate line of the plurality of gate lines and to a corresponding data line of the plurality of data lines, the switching device configured to output a corresponding data signal in response to the gate signal;
a micro-electro-mechanical system coupled to an output electrode of the switching device to control output of a light signal in response to the corresponding data signal; and
a control device coupled to the output electrode to control a time period for which the micro-electro-mechanical system transmits the light signal,
wherein the control device comprises a storage capacitor coupled to the output electrode and a transistor coupled to the output electrode, the storage capacitor connected in parallel with the transistor,
wherein the transistor comprises:
a source electrode to receive a common voltage;
a gate electrode coupled to the output electrode; and
a drain electrode coupled to the output electrode.

* * * * *